US012586148B2

(12) United States Patent
Meyer

(10) Patent No.: US 12,586,148 B2
(45) Date of Patent: Mar. 24, 2026

(54) EFFICIENT IMAGE WARPING BASED ON USER INPUT

(71) Applicant: ADOBE INC., San Jose, CA (US)

(72) Inventor: Guillaume Meyer, Paris (FR)

(73) Assignee: Adobe Inc., San Jose, CA (US)

( * ) Notice: Subject to any disclaimer, the term of this patent is extended or adjusted under 35 U.S.C. 154(b) by 290 days.

(21) Appl. No.: 18/526,936

(22) Filed: Dec. 1, 2023

(65) Prior Publication Data

US 2025/0182238 A1 Jun. 5, 2025

(51) Int. Cl.
*G06T 3/18* (2024.01)
*G06T 7/13* (2017.01)
*G06T 7/73* (2017.01)

(52) U.S. Cl.
CPC .................. *G06T 3/18* (2024.01); *G06T 7/13* (2017.01); *G06T 7/73* (2017.01); *G06T 2207/20092* (2013.01)

(58) Field of Classification Search
CPC .... G06T 3/18; G06T 7/13; G06T 7/73; G06T 2207/20092
See application file for complete search history.

(56) References Cited

U.S. PATENT DOCUMENTS

2010/0020880 A1* 1/2010 Susnow ............... H04N 19/182
375/E7.123

* cited by examiner

*Primary Examiner* — Christopher Wait
(74) *Attorney, Agent, or Firm* — Shook, Hardy & Bacon L.L.P.

(57) ABSTRACT

The technology described herein generally relates to warping images based on one or more user inputs. In some embodiments, a selection of pixels of an image is received and skeletonized. A starting pixel of the skeletonized set of pixels is determined. Horizontal distances between the starting pixel and other pixels of the skeletonized set of pixels are determined. Rows of pixels of the image that intersect the skeletonized set of pixels are determined. The image is modified by shifting each of the rows of pixels based on the corresponding horizontal distances.

20 Claims, 8 Drawing Sheets

700

710 — DETERMINE A FIRST HORIZONTAL DISTANCE BETWEEN A PIXEL OF AN IMAGE AND A FIRST SKELETONIZED CURVE

720 — DETERMINE A SECOND HORIZONTAL DISTANCE BETWEEN THE PIXEL AND A SECOND SKELETONIZED CURVE

730 — SHIFT THE PIXEL BASED ON THE FIRST HORIZONTAL DISTANCE AND THE SECOND HORIZONTAL DISTANCE

MEMORY

812

PROCESSOR(S)

814

PRESENTATION
COMPONENT(S)

816

I/O PORT(S)

818

I/O COMPONENTS

820

POWER SUPPLY

822

810

800

EFFICIENT IMAGE WARPING BASED ON USER INPUT

BACKGROUND

Many users of image-editing software reproduce real-life patterns (e.g., from photographs) in image-editing software. This practice is particularly useful in the fields of video game design, visual effects, apparel, and architecture. For instance, a user may capture an image of a brick wall, upload the image to an application, and utilize features provided by the application to apply the brick pattern to an object presented by the application such that at least a portion of the object appears to be made of brick.

However, in many such cases, the pattern will not "tile" properly. That is, depending on various properties of the pattern—such as the angle at which the image was captured, the curvature of the object on which the pattern appeared, and which portion or segment of the pattern was captured— the object to which the pattern is applied may appear to have seams where the edges of each tile of the pattern do not fully align with one another. Accordingly, the user may wish to modify (e.g., warp) the pattern, for example, such that the pattern tiles properly.

SUMMARY

Some aspects of the present technology relate to, among other things, systems and methods for modifying images, for example, such that images may be tiled in a visually appealing manner. In particular, in embodiments described herein, images are modified, or warped, in accordance with a user input, such as brushstroke. In this way, a user can efficiently and effectively initiate an automated image modification in accordance with a desired output (e.g., to prepare the image for more effective tiling). In accordance with some aspects, an image and a brushstroke input are received from a user device. The brushstroke is skeletonized, and rows of pixels of the image that intersect the skeletonized curve are identified. Vectors that extend from a line that intersects a starting pixel of the skeletonized curve to the skeletonized curve are determined. Such vectors are used to shift the rows of pixels, for example, based on the directions and magnitudes of corresponding vectors.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
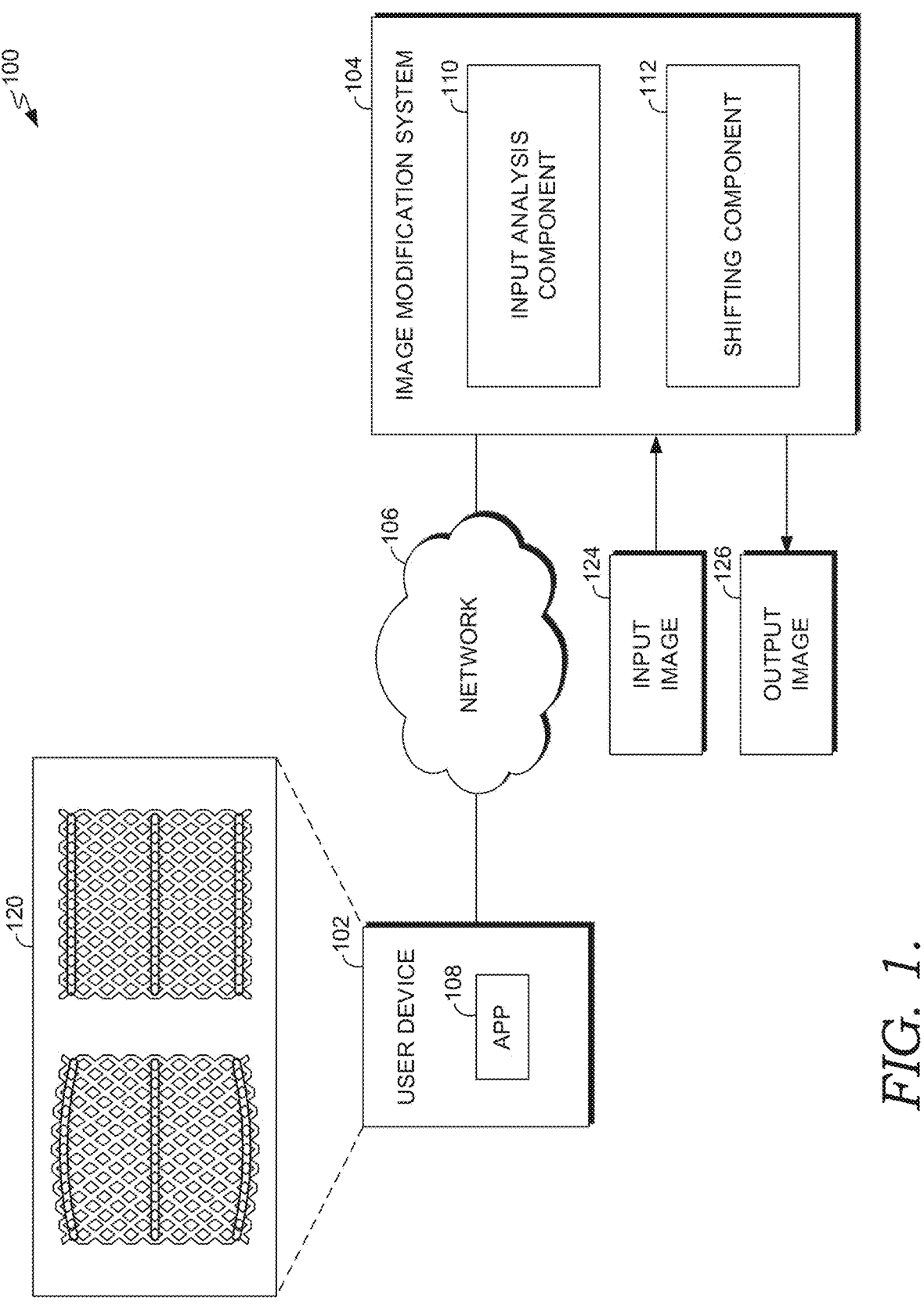
FIG. 1 is a block diagram illustrating an exemplary system in accordance with some implementations of the present disclosure.

Real-life patterns and textures can be difficult to reproduce in image-editing software. Manually drawing the pattern can be time consuming and difficult. For example, in some cases, a designer may utilize a picture of a pattern in an effort to reproduce the pattern. While this approach may be visually accurate, such an approach can be tedious and difficult when the designer attempts to repeat or tile the pattern. That is, edges of tiles comprising the pattern may not properly align with one another, resulting in seam lines at the edges of the tiles. For example, textures with strong structural patterns (e.g., bricks, fabrics, tiles, and wood) can be captured in a naturally deformed manner. Such patterns will not repeat well when tiled and may include repeated deformations.

In addition to the tedious and visually unappealing nature of repeating or tiling a pattern, such a process unnecessarily uses computing resources. In particular, as seam lines at the edges of tiles or mismatched tile edges may result from conventional tiling methods, computing resources may be unnecessarily utilized in an effort to obtain a more visually appealing repeating pattern. For example, tiles may be manually altered or moved in an effort to remove seam lines and/or better match tile edges, thereby consuming computing resources to achieve a desired visual appeal.

In some conventional implementations, two-dimensional grids are used to deform images. In this way, a user may initiate utilization of a two-dimensional grid in an effort to deform an image such that it can more effectively be used for tiling, or other design effects. For example, in one conventional implementation, deformations can be corrected with a predefined grid. In this regard, the user moves or manipulates each point of the lattice until the deformations are realigned. Such a workflow is tedious and requires intensive computation to process each of the manual manipulations and update the image accordingly.

As such, embodiments of the present disclosure are drawn to facilitating user-guided image modification such that images can be tiled, for example, in a visually appealing and efficient manner. In this regard, a user can provide an input (e.g., a stroke) to initiate modification or warping of the image in an automated and desired manner. As one example, the technology may be used to straighten a pattern of texture by warping such that the texture can be used as a repeatable tile. For instance, straightening the pattern by warping can facilitate alignment in that opposite sides of the texture can match, thereby resolving seam issues, and alleviate or reduce the natural deformations, thereby resolving the repeated deformations. As described herein, a user can initiate warping or texture deformation by efficiently performing a stroke or input, such as a painting brush stroke. In this way, the deformation is not limited to any predefined lattice. A user can additionally or alternatively straighten a texture via a simple user input, for example, by following the pattern flow with a brush stroke. In this case, the texture is realigned into a straight flow by extracting positions from the strokes.

As described, to efficiently and effectively facilitate image modification, a user can provide an input, such as a brush-stroke, which can be received as a contiguous selection of pixels of an image. Utilizing a brushstroke input as a basis for warping the image allows a user to intuitively shift portions (e.g., rows of pixels) of the image with as little as one fluid motion. The brushstroke can be skeletonized (e.g., simplified) in order to, for example, provided a consistent, precise reference point from which to warp the image. For example, if the skeletonized curve is oriented vertically, rows of pixels of the image would be warped to the right when the skeletonized curve's horizontal position is to the right of its starting point. As the skeletonized curve curves to the left, the corresponding rows of pixels will be shifting further to the left. The distance by which a row of pixels is shifted can be determined by generating vectors that extend from a line that intersects a starting pixel of the skeletonized curve to the skeletonized curve. Further, the row of pixels can be shifted in the direction in which the vector extends.

In some embodiments, multiple inputs (e.g., multiple selections of pixels) are received for an image. In such cases, each pixel positioned between two skeletonized curves can be shifted on a linear gradient. That is, the closer a pixel is to a first skeletonized curve (relative to a second skeleton-ized curve), the more influence the first skeletonized curve exerts over the location to which the pixel is shifted.

Example Image Modification System

With reference now to the drawings, FIG. 1 is a block diagram illustrating an exemplary system 100 for modifying images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102, an image modification system 104, and an example user interface 120. Each of the user device 102 and image modification system 104 shown in FIG. 1 can comprise one or more computer devices, such as the computing device 800 of FIG. 8, discussed below. As shown in FIG. 1, the user device 102 and the image modification system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the image modi-fication system 104 can be provided by multiple server devices collectively providing the functionality of the image modification system 104 as described herein. Additionally, other components not shown can also be included within the network environment.

The user device 102 can be a client device on the client side of operating environment 100, while the image modi-fication system 104 can be on the server side of operating environment 100. The image modification system 104 can comprise server-side software designed to work in conjunc-tion with client-side software on the user device 102 so as to implement any combination of the features and functionali-ties discussed in the present disclosure. For instance, the user device 102 can include an application 108 for interact-ing with the image modification system 104. The application 108 can be, for instance, a web browser or a dedicated application for providing functions, such as those described herein. One example of application 108 is a content creation application or design application that can initiate or facilitate image modification—for example, for image tiling. This division of operating environment 100 is provided to illus-trate one example of a suitable environment, and there is no requirement for each implementation that any combination of the user device 102 and the image modification system 104 remain as separate entities. While the operating envi-ronment 100 illustrates a configuration in a networked environment with a separate user device and image modi-fication system, it should be understood that other configu-rations can be employed in which components are com-bined. For instance, in some configurations, a user device can also provide capabilities of the technology described in association with the image modification system 104.

The user device 102 can comprise any type of computing device capable of use by a user or designer. For example, in one aspect, the user device can be the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the image modi-fication system 104 via the user device 102.

At a high level, the image modification system 104 receives and modifies an input image based on a user input. In some aspects, the user input is a brushstroke, and the image modification system 104 warps the input image based on the contours of the brushstroke. The brushstroke can be skeletonized, producing a "skeletonized curve." The image modification system 104 can warp the input image by shifting rows of pixels of the input image. The image modification system 104 can determine the distance and/or direction the rows of pixels are shifted based on vectors extending from a line that intersects a starting pixel of the skeletonized curve to the skeletonized curve.

As shown in FIG. 1, the image modification system 104 includes an input analysis component 110 and a shifting component 112. The components of the image modification system 104 can be in addition to other components that provide further additional functions beyond the features described herein. The image modification system 104 can be implemented using one or more server devices, one or more platforms with corresponding application programming interfaces, cloud infrastructure, and the like. While the image modification system 104 is shown separate from the user device 102 in the configuration of FIG. 1, it should be understood that in other configurations, some or all of the functions of the image modification system 104 can be provided on the user device 102.

In one aspect, the functions performed by components of the image modification system 104 are associated with one or more applications, services, or routines. In particular, such applications, services, or routines can operate on one or more user devices or servers, be distributed across one or more user devices and servers, or be implemented in the cloud. Moreover, in some aspects, these components of the image modification system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein with regards to specific components shown in example system 100, it is contemplated that in some aspects, functionality of these components can be shared or distributed across other components.

The input analysis component 110 is configured to receive an input image 124. The input image 124 can be received from a user device 102—e.g., via an application 108. The input image 124 can be a two- or three-dimensional image and can comprise any suitable file format. Non-limiting examples of suitable file formats include Joint Photographic Experts Group (JPEG or JPG), Graphics Interchange Format (GIF), bitmap (BMP), and Portable Network Graphics (PNG).

In some aspects, the input image is an image of (or comprises a depiction of) a surface, texture, and/or pattern. For example, a user can capture an image of a pattern (e.g., a surface or texture such as brick) and upload the image to an application (e.g., the application 108) that allows the user to use the pattern as an asset in the creation or modification of a two- or three-dimensional image or model. The user can, for instance, capture an image of a brick wall, upload the image to the application 108, and utilize features provided by the application 108 to apply the brick pattern to an object presented by the application such that at least a portion of the object appears to be made of brick. However, in many such cases, the pattern will not "tile" properly. That is, depending on various properties of the pattern—such as the angle at which the image was captured, the curvature of the object on which the pattern appeared, and which portion or segment of the pattern was captured—the object to which the pattern is applied may appear to have seams where the edges of each tile of the pattern do not fully align with one another. Accordingly, the user may wish to modify (e.g., warp) the pattern such that pattern tiles properly.

The input analysis component 110 can also receive a selection of pixels of an image. The selection of pixels can, for example, correspond to a manner in which a user wishes to modify (e.g., warp) the pattern. The image from which the pixels are selected can be the input image 124 or another image (whether two- or three-dimensional) comprising the pattern of the input image 124, for example. In some embodiments, the selection of pixels is a selection of a plurality of contiguous pixels of the image. The selection of pixels can be determined by a brushstroke and/or a click-and-drag (or touch-and-drag) input, for example.

Figure 2:
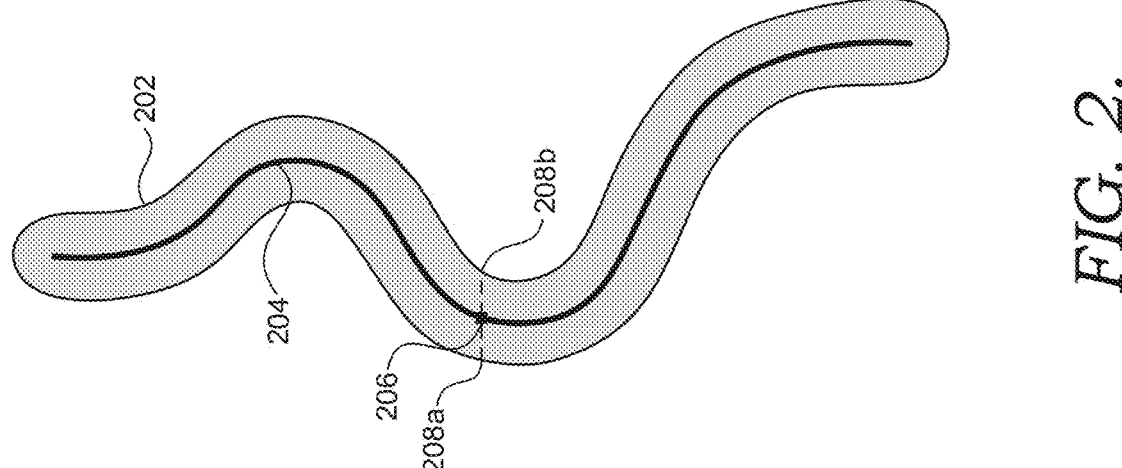
FIG. 2 is an exemplary user input in accordance with some implementations of the present disclosure.
Figure 2:

Because the selection of pixels may be more than one pixel wide (and may have different widths or heights in different locations), the input analysis component 110 can determine a particular subset of pixels within the selection of pixels—e.g., by skeletonizing the selection of pixels. Skeletonization generally refers to a representation of key topological and geometric features in an object (e.g., a selection of pixels). In this way, skeletonization reduces the dimension of an object to generate medial axis. Advantageously, skeletonizing the selection of pixels can simplify the tasks to be performed by the shifting component 112, which is discussed below. By way of example, and with reference to FIG. 2, FIG. 2 is an illustration 200 of a selection of pixels 202 and a corresponding skeletonized curve 204. The skeletonized curve 204 can be a subset of pixels of the selection of pixels 202. In some embodiments, the skeletonized curve 204 is a width (e.g., a maximum width) of one pixel along its length. The pixels of the skeletonized curve 204 can be equidistant (or approximately equidistant) to boundaries of the selection of pixels 202. For example, the pixel 206 of the skeletonized curve 204 is included in the skeletonized curve because it is equidistant from the boundary locations 208a and 208b of the selection of pixels 202. In this regard, the skeletonized curve 204 is a center path (e.g., of a brush stroke).

Figure 3:
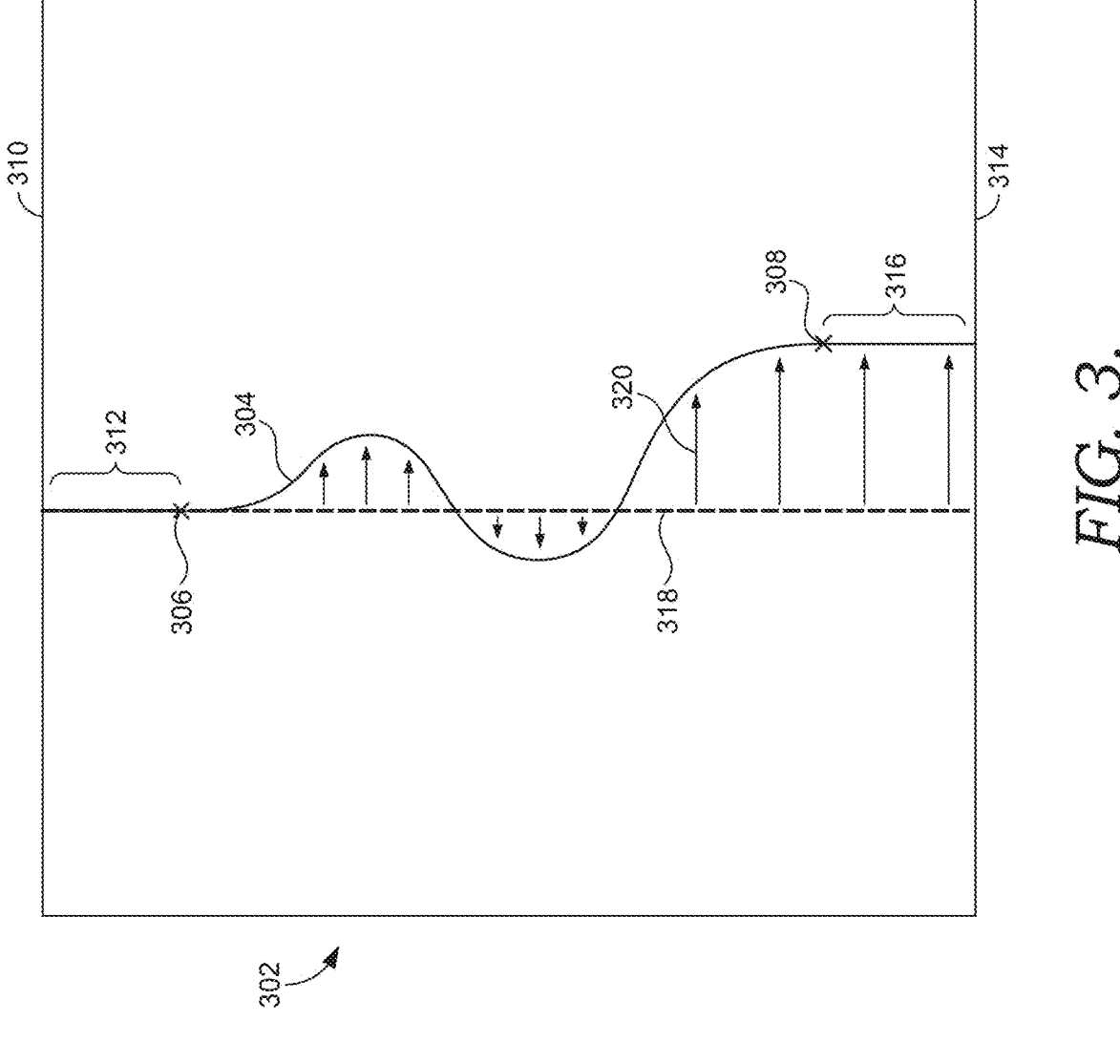
FIG. 3 is an exemplary image on which a skeletonized curve is overlaid in accordance with some implementations of the present disclosure.

The input analysis component 110 can also determine a starting pixel associated with a selection of pixels. In some embodiments, a starting pixel of the particular subset of pixels (e.g., the skeletonized curve) is determined. The starting pixel can serve as a reference point relative to which portion(s) of the image is to be modified or warped. FIG. 3 is an illustration 300 of an image 302 on which the skeletonized curve 304 (which corresponds to the skeletonized curve 204 of FIG. 2) is overlaid. In the example shown in FIG. 3, the skeletonized curve 304 comprises a first endpoint 306 and a second endpoint 308.

The input analysis component 110 can determine which of the endpoints (i.e., 306 and 308) of the skeletonized curve 304 is the starting pixel of the skeletonized curve. In some embodiments, the starting pixel is determined according to a setting or configuration of an application (e.g., 108) in which the image 302 is being edited. For example, the setting can require that the topmost, bottommost, leftmost, or rightmost of the skeletonized curve's 304 endpoints be designated the starting pixel. The application can allow a user to change the setting (e.g., from "topmost" to "bottommost") as desired. Similarly, the application can allow the user to indicate an orientation of the skeletonized curve 304, which can be received by the input analysis component 110 and used to determine the starting pixel. For example, the input analysis component 110 can receive an indication that the skeletonized curve 304 is oriented downward and, based on the indication, can determine that the higher of the two endpoints is the starting pixel.

In the same or other embodiments, the starting pixel is determined according to a manner in which the selection of pixels (e.g., from which the skeletonized curve 304 was determined) was received. For example, if the selection of pixels was received as a brushstroke (e.g., a click-and-drag or touch-and-drag input), the input analysis component 110 can determine that the starting pixel is the endpoint of the skeletonized curve 304 that is closest to a location at which the brushstroke began.

In some cases, the skeletonized curve 304 may intersect (i.e., cross over) itself. In such cases, the input analysis component 110 can delete, from the skeletonized curve 304, all pixels of the skeletonized curve 304 that were received subsequent to the point (e.g., in time) at which the skeletonized curve 304 intersected itself. Deleting such pixels from the skeletonized curve 304 can preclude situations in which the shifting component 112 (discussed below) is required to perform contradictory operations. Similarly, in cases in which multiple selections of pixels are received for an image (as discussed below), the resulting skeletonized curves may intersect. In such cases, the input analysis component 110 can delete, from one or both of the skeletonized curves, all pixels of the skeletonized curve(s) that were received subsequent to the point (e.g., in time) at which the curves intersected one another.

The shifting component 112 (shown in FIG. 1) is generally configured to perform any of several operations in order to modify or warp images, such as image 302. For example, with continued reference to FIG. 3, the shifting component 112 can extend the skeletonized curve 304 from its endpoints to respective edges of the image. Extending the skeletonized curve 304, for example, to edges of the image, can aid the shifting component 112 in determining how (or whether) to shift rows of pixels that do not intersect the skeletonized curve 304, as discussed in more detail below. If the skeletonized curve 304 is oriented vertically (e.g., according to a setting or user indication), the shifting component 112 can extend the skeletonized curve 304 (a) from an uppermost endpoint 306 of the skeletonized curve 304 to a top edge 310 of the image 302 and (b) from a lowermost endpoint 308 of the skeletonized curve 304 to a bottom edge 314 of the image 302. In the example shown in FIG. 3, this process forms a first extended portion 312 and a second extended portion 316. Similarly, if the skeletonized curve 304 is oriented horizontally (e.g., according to a setting or user indication), the shifting component can extend the skeletonized curve 304 (a) from a leftmost endpoint of the skeletonized curve 304 to a left edge of the image 302 and (b) from a rightmost endpoint of the skeletonized curve 304 to a right edge of the image 302.

The shifting component 112 also shifts pixels (e.g., rows of pixels) based on the skeletonized curve 304. In some aspects—e.g., when the skeletonized curve is oriented vertically, as shown in FIG. 3—the shifting component 112 determines a horizontal distance between a vertical axis corresponding with the starting pixel 306 and each pixel of the skeletonized curve 304. For example, the shifting component 112 can create a vertical line 318 extending to the top edge 310 and the bottom edge 314 of the image 302 and having the same horizontal location (e.g., coordinate) as the starting pixel 306. The shifting component 112 can determine vectors (e.g., 320) extending from the line 318 to each of the pixels of the skeletonized curve 304.

In some aspects, the shifting component 112 shifts rows of pixels of the image 302 based on the magnitudes of the vectors. For example, for rows of pixels of the image 302 (e.g., each row of pixels of the image 302 intersected by the skeletonized curve 304 or the extended curve), the shifting component 112 can identify a corresponding vector (e.g., a vector contained in the particular row) and shift pixels (e.g., all pixels) of the particular row based on the magnitude of the corresponding vector. In some aspects, the distance by which the shifting component 112 shifts the pixels of the row is equal to the magnitude of the corresponding vector. For example, if the corresponding vector is 10 pixels in magnitude, each pixel of the corresponding row can be shifted 10 pixels—e.g., in the direction in which the vector extends.

Although the example illustrated above involves shifting pixels horizontally, this is merely an example, and it is contemplated that the shifting component 112 can be configured to shift pixels in other directions (e.g., vertically or diagonally), in some aspects. For example, if the input analysis component 110 determines that the skeletonized curve comprises a horizontal orientation (e.g., based on a user indication and/or a setting), the shifting component 112 can determine a horizontal line extending through the starting pixel, determine vertically-extending vectors from the horizontal line to pixels of the skeletonized curve, and shift pixels of the image vertically based on the corresponding vectors. Similarly, if the input analysis component 110 determines that the skeletonized curve comprises an angled (i.e., not vertical or horizontal) orientation (e.g., based on a user indication and/or a setting), the shifting component 112 can determine a line extending through the starting pixel and angled based on (e.g., equal to) the angle at which the skeletonized curve is oriented, determine vectors perpendicular to the line that extend to pixels of the skeletonized curve, and shift diagonally-oriented rows or groups of pixels based on the corresponding vectors. Although generally described herein as shifting pixels based on vectors perpendicular to a line extending through a starting pixels, as can be appreciated, other pixels associated with the input path, or skeletonized curve, may be utilized. For example, an ending endpoint or a center point of a skeletonized curve may be used to generate an extended line for identifying perpendicular vectors.

Following the shifting process, the shifting component 112 can provide an output image 126. Such an output image provides the pixels shifted in association with the input curve or selection of pixels from the input image 124. In this way, the output image is provided for presentation at a user interface by a user interface component 114. For example, FIG. 1 illustrates an example user interface 120 showing a transformation of an input image into an output image in which pixels have been shifted by the image modification system 104. Whereas the example input image would not tile properly due to its curve edges, for example, the output image is a straightened, repeatable grid that would tile properly (e.g., without seams).

Figure 4:
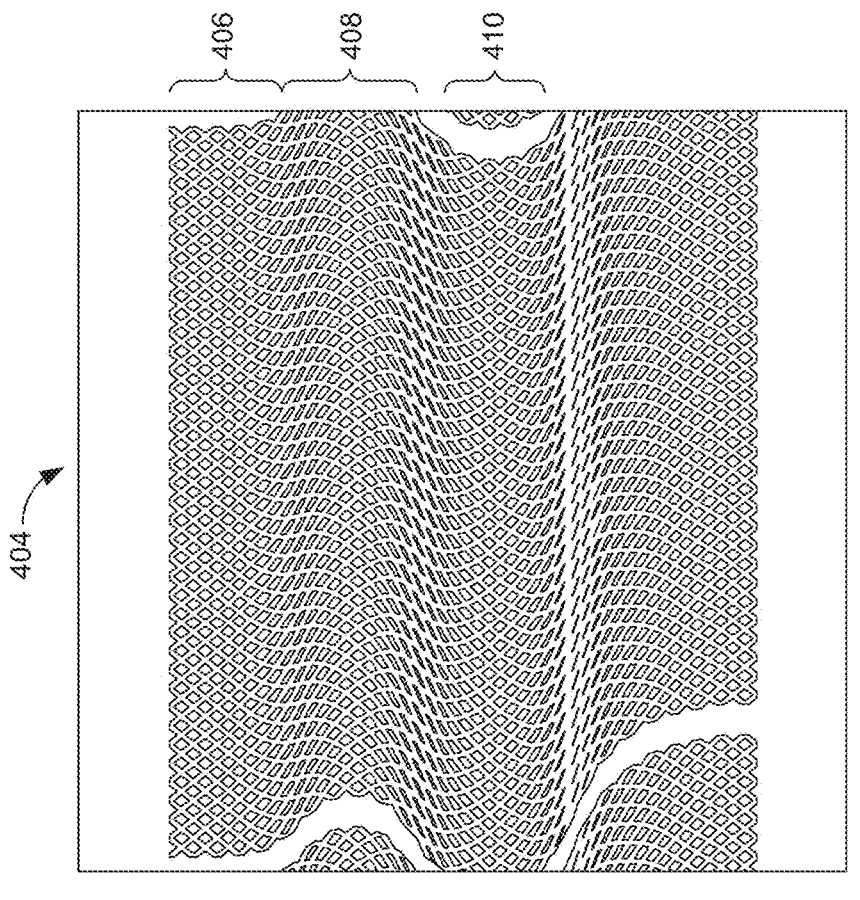
FIG. 4 is a side-by-side view of an exemplary input image and an exemplary output image in accordance with some implementations of the present disclosure.
Figure 4:
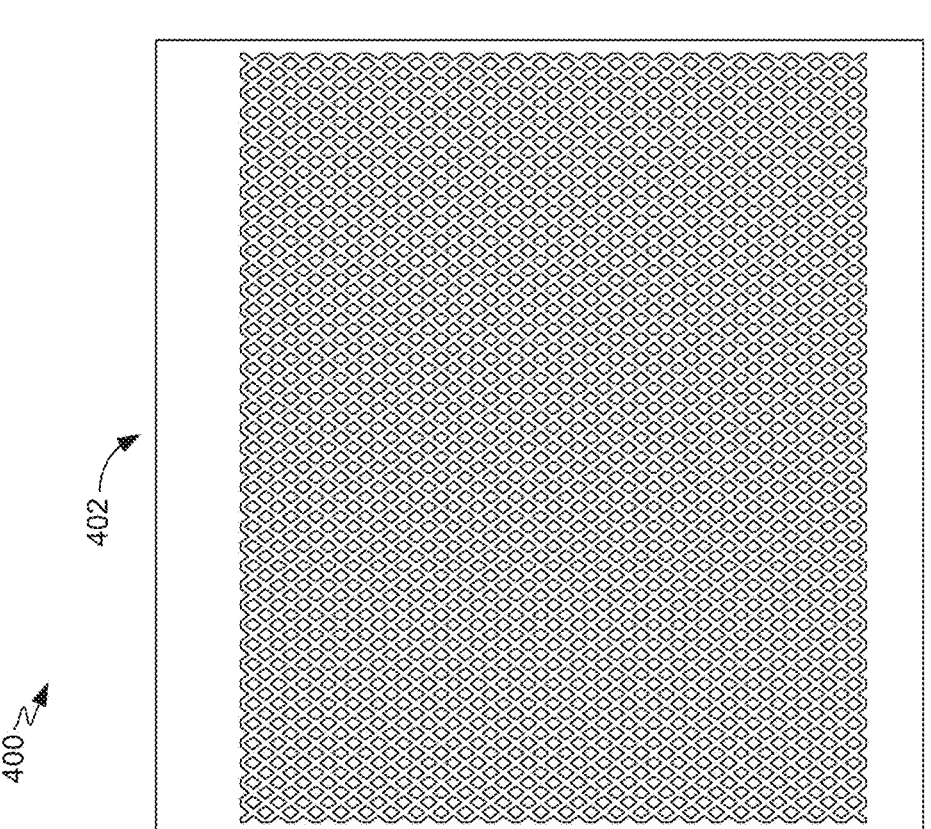

FIG. 4 is an illustration 400 of an example input image 402 and output image 404 wherein pixels of the output image 404 are shifted by the shifting component 112 based on the skeletonized curve shown in FIGS. 2 and 3. For example, rows of pixels 406—which correspond to the rows of pixels of the image 302 that intersect the first extended portion 312 of the skeletonized curve 304—are not shifted at all because the horizontal location of the starting pixel 306 is the same as the horizontal location of the line 318 at those locations (and thus, the corresponding vector has a length of zero). At other locations, such as 408, rows of pixels are shifted or warped to the right because the corresponding vectors extend rightward. Conversely, the rows 410 are shifted to the left because the corresponding vectors extend leftward.

In some aspects, the input analysis component 110 receives multiple inputs (e.g., selections of pixels) for an image. In such cases, the shifting component 112 may need to reconcile conflicting instructions. For example, a vector for a first input and a first row of pixels may indicate that the row of pixels should be shifted 13 pixels to the right, while a vector for a second input may indicate that the same row of pixels should be shifted 19 pixels to the left. Thus, in order to, for example, reconcile contradictory inputs—while producing a coherent output image and accurately reflecting user intent—the shifting component 112 can perform any of several operations when multiple inputs are received for an image.

In some aspects, for example, after receiving multiple inputs and determining corresponding skeletonized curves, the shifting component 112 checks each row of pixels of the image in order to determine whether the row of pixels intersects (e.g., shares at least one pixel with) more than one skeletonized curve. If the row of pixels intersects only one skeletonized curve, the shifting component 112 can shift the row of pixels based on the skeletonized curve as described above with reference to the example shown in FIGS. 3-4. On the other hand, if the row of pixels intersects more than one skeletonized curve, the shifting component 112 can check whether a pixel of the row is located between two skeletonized curves (e.g., is located to the left of a point at which the row intersects a first skeletonized curve and is located to the right of a point at which the row intersects a second skeletonized curve). If the pixel is not located between two skeletonized curves, the shifting component 112 can shift the pixel based on the closest skeletonized curve (e.g., as described above in reference to FIGS. 3-4).

On the other hand, if the pixel is located between two skeletonized curves, the shifting component 112 can shift the pixel based on one or both skeletonized curves. As described above in reference to FIGS. 3-4, for each pixel row that intersects a skeletonized curve, a vector can be determined based on a distance between the skeletonized curve and a line—e.g., the line 318 in FIG. 3—extending from a starting pixel of the skeletonized curve. Accordingly, when the pixel is located between a first skeletonized curve and a second skeletonized curve, the shifting component 112 can shift the pixel based both on a first vector for the first skeletonized curve and a second vector for the second skeletonized curve (both vectors corresponding to the row of the pixel).

In some embodiments, the shifting component 112 weights the first and second vectors based on the pixel's respective horizontal distances from the first and second skeletonized curves. For example, if the pixel is located closer to the first skeletonized curve than the second skeletonized curve, the shifting component 112 can assign a higher weight to the first vector than the second vector. In some aspects, the shifting component 112 assigns the weights to the vectors according to a linear gradient. For example, if the pixel is 7 pixels away from the first skeletonized curve and 13 pixels away from the second skeletonized curve, the shifting component 112 can assign the first vector a weight of 0.65 (i.e., $^{13}/_{20}$) and assign the second vector a weight of 0.35 (i.e., $^{7}/_{20}$). The shifting component 112 can sum the weighted vectors and shift the pixel based on the resulting vector. For example, the shifting component 112 can shift the pixel a distance equal to a magnitude of the resulting vector.

Figure 5:
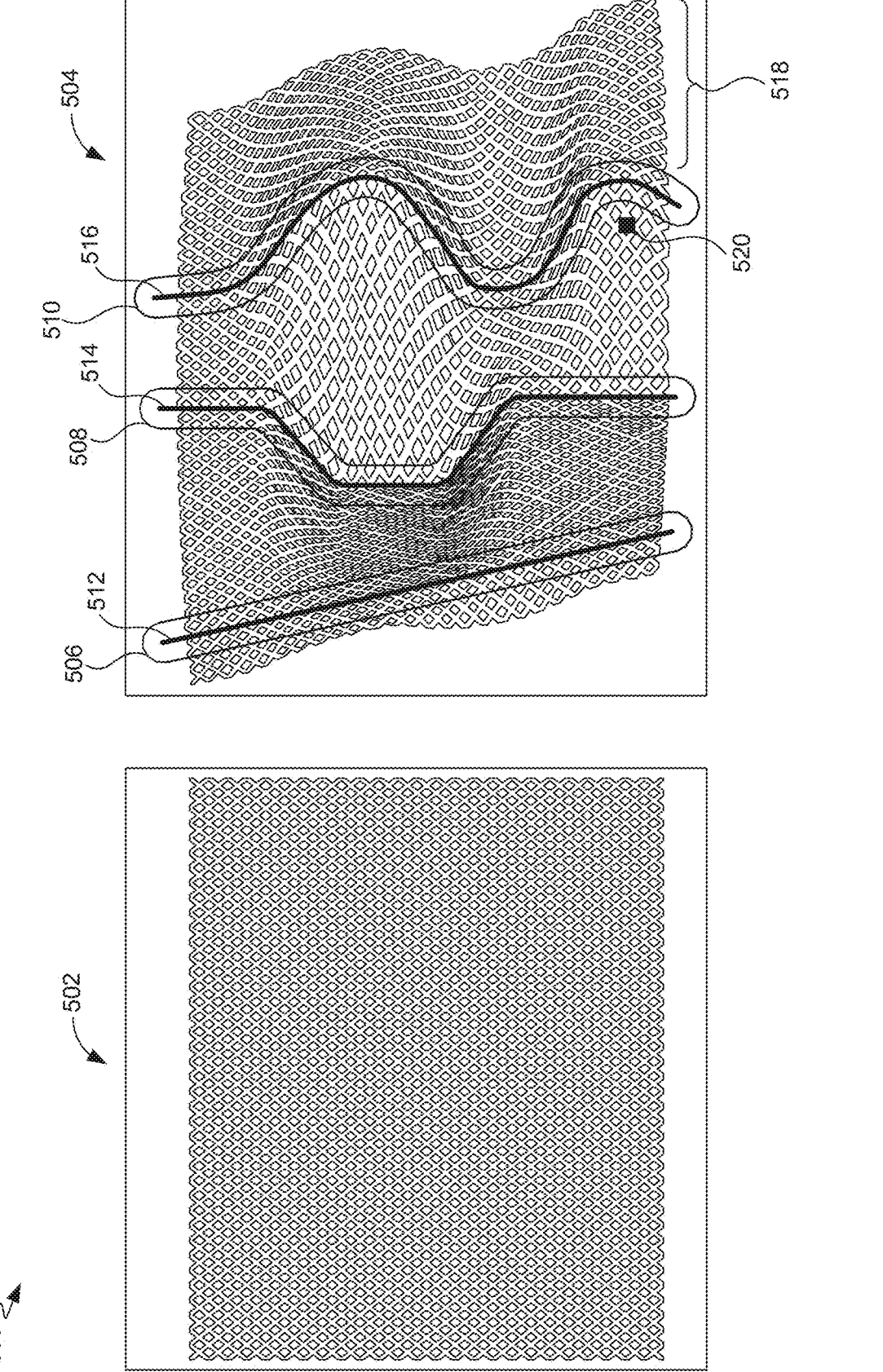
FIG. 5 is a side-by-side view of the exemplary input image and another exemplary output image in accordance with some implementations of the present disclosure.

To illustrate how the shifting component 112 operates when multiple inputs are received, FIG. 5 provides an illustration 500 of an example input image 502 and an example output image 504. In FIG. 5, pixels of the output image 504 have been shifted based on three selections of pixels 506, 508, and 510 and the selections' respective skeletonized curves 512, 514, and 516.

The pixels in region 518, for instance, are not located between two skeletonized curves. Thus, as shown, the pixels in the region 518 have only been shifted based on the skeletonized curve 516, which is (horizontally) the closest skeletonized curve to each pixel in the region 518.

The pixel 520, on the other hand, is located between two skeletonized curves—i.e., 514 and 516. Thus, the shifting component 112 shifted the pixel 520 based on both the skeletonized curve 514 and the skeletonized curve 516. Because the pixel's horizontal distance (e.g., prior to shifting) from the skeletonized curve 514 was greater than the pixel's distance from the skeletonized curve 516, the shifting component 112 assigned a higher weight to the vector associated with the skeletonized curve 516. Thus, the pixel 520 was shifted (and the surrounding area was warped) to the right (i.e., toward the skeletonized curve 516).

As previously explained in regard to FIGS. 3-4, although the example illustrated above involves shifting pixels horizontally based on vertically-oriented selections of pixels, this is merely an example, and it is contemplated that the shifting component 112 can be configured to shift pixels in other directions (e.g., vertically or diagonally) in some aspects. For example, if the input image 502, the output image 504, and the inputs (i.e., 506, 508, and 510) were rotated 90 degrees (and the inputs were thus oriented horizontally), the shifting component's 112 modes of operation described above would still apply, and the pixels would be shifted vertically rather than horizontally.

Example Method

Figure 6:
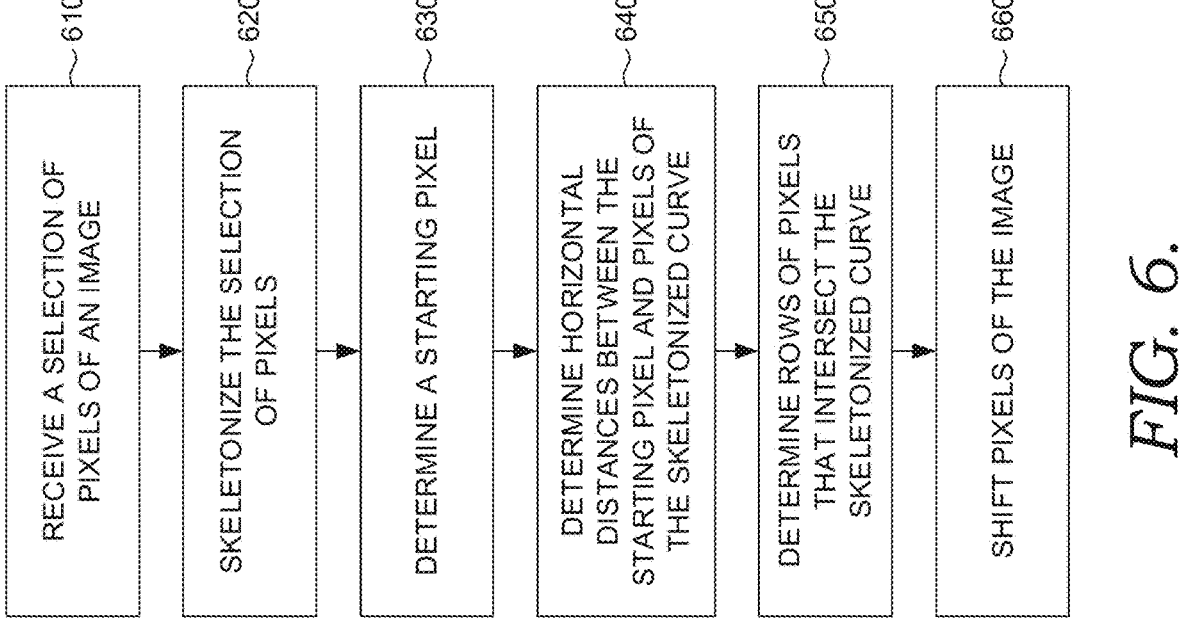
FIGS. 6-7 are flow diagrams showing methods of modifying images in accordance with some implementations of the present disclosure.

With reference now to FIG. 6, a flow diagram is provided that illustrates a method 600 for modifying an image. The method 600 can be performed, for instance, by the image modification system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few examples.

At block 610, a selection of pixels of an image is received. The selection of pixels and/or the image can be received from a user device. The selection of pixels can be a brushstroke, such as a click-and-drag or touch-and-drag input. In embodiments, the selection of pixels is a contiguous set of pixels determined based on an input—e.g., an input received from a user device. The image can comprise any suitable file format and can comprise a representation of a texture and/or surface, for example.

At block 620, the selection of pixels is skeletonized. The skeletonized curve can comprise a width (if the skeletonized curve is oriented vertically) or height (if the skeletonized curve is oriented horizontally) of one pixel along its length. Pixels of the skeletonized curve can be positioned equidistant (or approximately equidistant) from borders or edges of the selection of pixels.

At block 630, a starting pixel is determined. The starting pixel can be an endpoint of the skeletonized curve. If the selection of pixels was received as a brushstroke, for example, the starting pixel can correspond to a location at which the brushstroke began. Further, the skeletonized curve can be extended from the starting pixel and/or an endpoint pixel to corresponding edges of the image.

At block 640, horizontal distances between the starting pixel and pixels of the skeletonized curve are determined. In some aspects, a line is determined that (a) is oriented in the same direction as the selection of pixels (and/or skeletonized curve) and (b) intersects the starting pixel. Vectors can be determined—e.g., for each row of pixels of the image—that extend between the line and pixels of the skeletonized curve (e.g., from the line to the skeletonized curve). The magnitudes of these vectors are the horizontal distances between the starting pixel and the pixels of the skeletonized curve. (An analogous approach can be employed if the skeletonized curve is oriented horizontally instead of vertically; that is, vertical distances between the starting pixel and the skeletonized curve can be determined.)

At block 650, rows of pixels that intersect the skeletonized curve are determined. That is, each row of pixels of the image that shares at least at least one pixel with the skeletonized curve is identified.

At block 660, pixels of the image are shifted. Each pixel belonging to a row of pixels of the image that intersects the skeletonized curve (as determined at block 650) can be shifted. Each pixel can be shifted in the same direction in which the corresponding vector extends. Each pixel can be shifted a distance equal to the magnitude of the corresponding vector. The resulting modified or warped image can be presented for display at a user interface (e.g., on the user device from which the selection of pixels was received).

Figure 7:
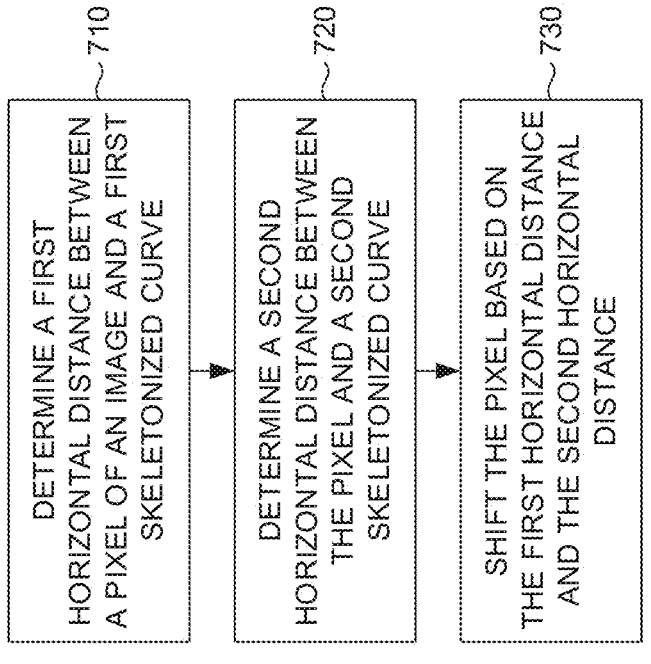

With reference now to FIG. 7, a flow diagram is provided that illustrates a method 700 for modifying an image. The method 700 can be performed, for instance, by the image modification system 104 of FIG. 1.

At block 710, a first horizontal distance between a pixel of an image and a first skeletonized curve is determined. The pixel of the image can be a pixel positioned horizontally between a first skeletonized curve and a second skeletonized curve. The first and second skeletonized curves can be determined (e.g., from respective brushstroke inputs) in the same manner as described above with respect to block 620, for example. The first horizontal distance can be measured as a number of pixels in a horizontal row of pixels extending between the skeletonized curve and the pixel, for example.

At block 720, a second horizontal distance between the pixel and a second skeletonized curve is determined. The second horizontal distance can be determined in the same manner as the first horizontal distance, as described above in regard to block 710.

At block 730, the pixel is shifted based on the first horizontal distance and the second horizontal distance. The pixel can also be shifted based on first and second vectors for the first and second skeletonized curves, respectively, which can each be determined as previously explained in regard to block 640. Weights can be assigned to the first and second vectors based on the first and second horizontal distances, respectively. For example, if the pixel is located closer to the first skeletonized curve than the second skeletonized curve, a higher weight can be assigned to the first vector than the second vector. The weighted vectors can be summed, and the pixel can be shifted based on the resulting vector (e.g., shifted a distance corresponding to the magnitude of the resulting vector and in the direction in which the resulting vector is oriented).

Exemplary Operating Environment

Figure 8:
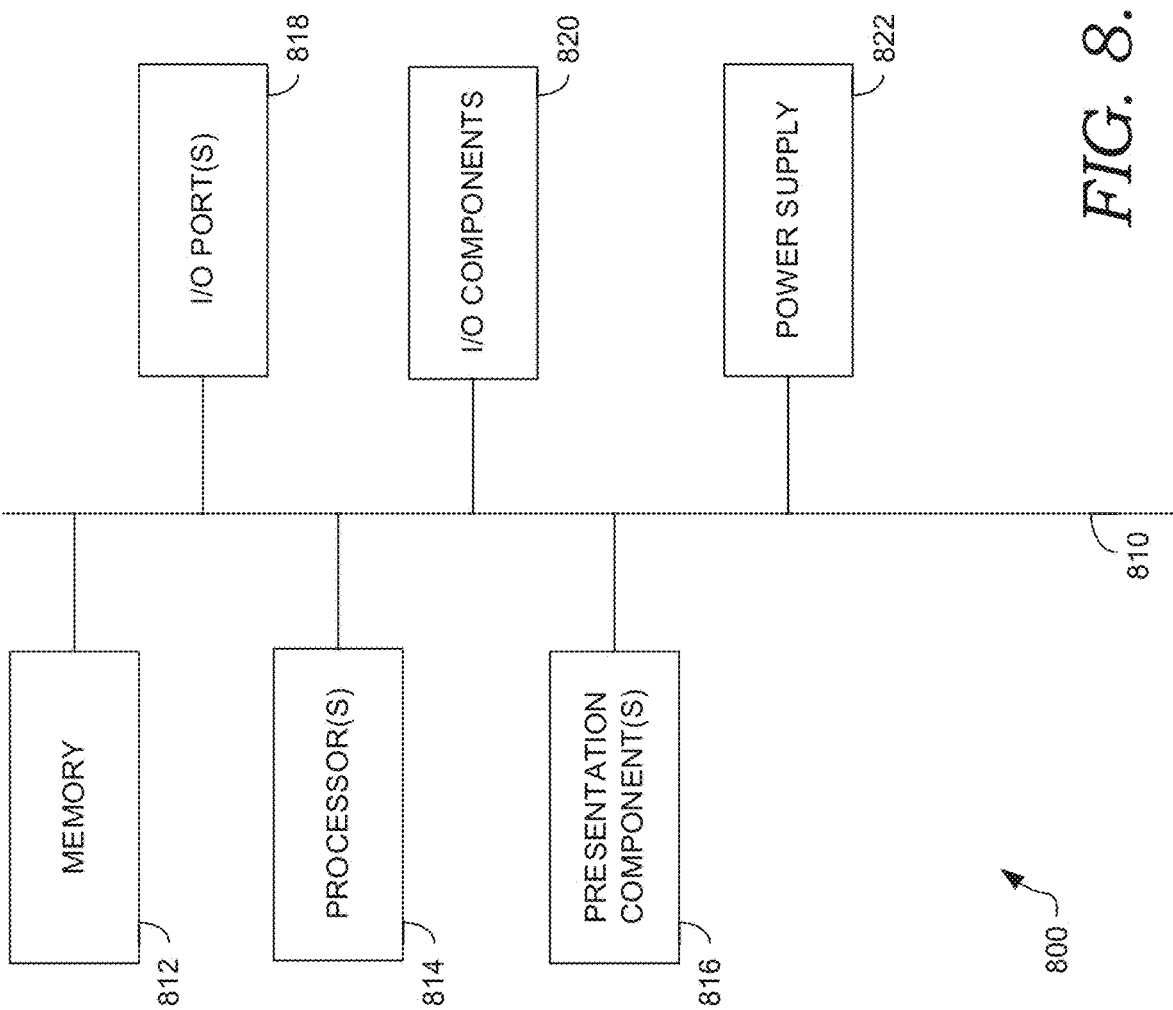
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring to FIG. 8, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

I claim:

1. A method comprising:

receiving a first selection of pixels of an image;

determining a first subset of pixels from the first selection of pixels;
identifying a first starting pixel of the first subset of pixels;
determining a first horizontal distance between the first starting pixel and a pixel of the first subset of pixels, wherein the pixel of the first subset of pixels is located in a row of pixels of the image; and
modifying the image by horizontally shifting the row of pixels based on the first horizontal distance between the first starting pixel and the pixel of the first subset of pixels.

2. The method of claim 1, the method further comprising:
receiving a second selection of pixels of the image;
determining a second subset of pixels from the second selection of pixels;
identifying a second starting pixel of the second subset of pixels;
determining a second horizontal distance between the second starting pixel and a second pixel of the second subset of pixels, wherein the second pixel of the second subset of pixels is located in the row of pixels; and
shifting each pixel of the row of pixels that is positioned between the pixel of the first subset of pixels and the second pixel of the second subset of pixels based on the first horizontal distance and the second horizontal distance.

3. The method of claim 1, wherein the first selection of pixels is a contiguous set of pixels determined based on an input received via a user device.

4. The method of claim 1, wherein the first subset of pixels is determined by skeletonizing the first selection of pixels.

5. The method of claim 1, wherein the first starting pixel is an endpoint of the first subset of pixels.

6. The method of claim 1, the method further comprising:
extending the first subset of pixels vertically from the starting pixel to an edge of the image.

7. The method of claim 1, the method further comprising:
receiving an indication of an orientation of the first selection of pixels,
wherein the determining the first starting pixel is based on the indication of the orientation.

8. A non-transitory computer-readable medium storing executable instructions, which when executed by a processing device, cause the processing device to perform operations comprising:
receiving a first selection of pixels of an image;
determining a first subset of pixels from the first selection of pixels, wherein each pixel of the first subset of pixels is positioned in a respective row of pixels of the image;
determining horizontal distances between a line extending from an endpoint pixel of the first subset of pixels and each pixel of the first subset of pixels; and
modifying the image by, for each pixel of the first subset of pixels, horizontally shifting pixels in the respective row of pixels of the image based on the horizontal distance for the pixel of the first subset of pixels.

9. The non-transitory computer-readable medium of claim 8, the operations further comprising:
receiving a second selection of pixels of the image;
determining a second subset of pixels from the second selection of pixels;
determining second horizontal distances between a line extending from a second endpoint pixel of the second subset of pixels and each pixel of the second subset of pixels; and

for a plurality of pixels positioned horizontally between the first subset of pixels and the second subset of pixels in the image, shifting each pixel of the plurality of pixels based on the horizontal distance corresponding to a row of the pixel and the second horizontal distance corresponding to the row of the pixel.

10. The non-transitory computer-readable medium of claim 9, the operations further comprising:
based on determining that the second subset of pixels intersects the first subset of pixels at a location of the image, excluding rows of pixels positioned below the location from the plurality of rows of pixels.

11. The non-transitory computer-readable medium of claim 8, wherein the line extends in a vertical direction.

12. The non-transitory computer-readable medium of claim 8, wherein the first selection of pixels is a contiguous set of pixels determined based on an input received via a user device.

13. The non-transitory computer-readable medium of claim 8, wherein the first subset of pixels is determined by skeletonizing the first selection of pixels.

14. The non-transitory computer-readable medium of claim 8, wherein the endpoint pixel is a starting pixel of the first subset of pixels.

15. The non-transitory computer-readable medium of claim 8, the operations further comprising:
extending the first subset of pixels vertically from the endpoint pixel to an edge of the image.

16. The non-transitory computer-readable medium of claim 8, the operations further comprising:
receiving an indication of an orientation of the first selection of pixels,
wherein the determining the endpoint pixel is based on the indication of the orientation.

17. A system comprising:
a memory component; and
a processing device coupled to the memory component, the processing device to perform operations comprising:
receiving a first selection of pixels of an image;
determining a first subset of pixels from the first selection of pixels;
determining a first starting pixel of the first subset of pixels;
receiving a second selection of pixels of the image;
determining a second subset of pixels from the second selection of pixels;
determining a second starting pixel of the second subset of pixels;
identifying a third pixel of the image, wherein the third pixel is positioned in a same row of pixels of the image as a first pixel of the first subset of pixels and a second pixel of the second subset of pixels;
determining a first horizontal distance between the first starting pixel and the first pixel;
determining a second horizontal distance between the second starting pixel and the second pixel; and
modifying the image by horizontally shifting the third pixel based on the first horizontal distance and the second horizontal distance.

18. The system of claim 17, the operations further comprising:
determining a first vector having a first magnitude equal to the first horizontal distance; and
determining a second vector having a second magnitude equal to the second horizontal distance, wherein the horizontally shifting the third pixel is based on a sum of the first vector and the second vector.

19. The system of claim 18, the operations further comprising:

assigning a first weight to the first vector; and assigning a second weight to the second vector, wherein the first weight is greater than the second weight based at least partially on a first distance between the first pixel and the third pixel being less than a second distance between the second pixel and the third pixel, and wherein the horizontally shifting the third pixel is based on the first weight and the second weight.

20. The system of claim 17, wherein each of the first selection of pixels and the second selection of pixels is a contiguous set of pixels determined based on a brushstroke input received from a user device.

* * * * *